United States Patent
Tezuka et al.

(10) Patent No.: US 8,497,649 B2
(45) Date of Patent: Jul. 30, 2013

(54) MOTOR DRIVING CONTROL APPARATUS FOR CONTROLLING MOTOR OUTPUT ACCORDING TO POWER CHARACTERISTICS OF AC POWER SUPPLY

(75) Inventors: Junichi Tezuka, Yamanashi (JP); Kazuyuki Sugiyama, Yamanashi (JP)

(73) Assignee: FANUC Corporation, Yamanashi (JP)

( * ) Notice: Subject to any disclaimer, the term of this patent is extended or adjusted under 35 U.S.C. 154(b) by 0 days.

(21) Appl. No.: 13/362,448

(22) Filed: Jan. 31, 2012

(65) Prior Publication Data

US 2012/0206080 A1  Aug. 16, 2012

(30) Foreign Application Priority Data

Feb. 10, 2011  (JP) ................................ 2011-027690

(51) Int. Cl.
*H02P 7/00* (2006.01)
*H02P 27/04* (2006.01)
*H02P 23/00* (2006.01)
*H02M 7/48* (2007.01)
*H02M 7/5387* (2007.01)

(52) U.S. Cl.
USPC ........... 318/434; 318/801; 318/802; 318/805; 318/808; 318/811; 363/71; 363/132

(58) Field of Classification Search
USPC .... 318/434, 801, 802, 805, 808, 811; 363/71, 363/132
See application file for complete search history.

(56) References Cited

U.S. PATENT DOCUMENTS 7,292,004 B2 *   11/2007  Ueda et al. ..................... 318/805
2004/0090807 A1 *  5/2004  Youm ........................... 363/132
2004/0245961 A1 * 12/2004  Ueda et al. ..................... 318/805
2009/0058341 A1 *  3/2009  Lu et al. ........................ 318/504
2009/0079379 A1 *  3/2009  Abe ......................... 318/568.24

FOREIGN PATENT DOCUMENTS

| JP | 3252114 B2 | 1/2002 |
| JP | 2003-189635 A | 7/2003 |
| JP | 2004-166477 A | 6/2004 |
| JP | 2005-151744 A | 6/2005 |

(Continued)

OTHER PUBLICATIONS

A Japanese Office Action dated May 29, 2012 in Japanese Application No. 2011-027690.

(Continued)

*Primary Examiner* — Walter Benson
*Assistant Examiner* — Gabriel Agared
(74) *Attorney, Agent, or Firm* — Lowe Hauptman Ham & Berner, LLP

(57) ABSTRACT

A motor driving control apparatus includes a motor driving unit which drives a motor and a driving control unit which supplies to the motor driving unit a command value for the motor driving unit to drive the motor. A power characteristic acquiring unit acquires a power characteristic of an AC power supply that supplies power to the motor. A control parameter determining unit determines based on a voltage characteristic of the AC power supply whether, during driving of the motor, the voltage of the AC power supply drops to a level that adversely affects the driving of the motor, and if positive, the control parameter determining unit sets a control parameter so that the voltage of the AC power supply does not drop below that level and supplies the control parameter to the driving control unit in order for the driving control unit to determine the command value.

1 Claim, 3 Drawing Sheets

FOREIGN PATENT DOCUMENTS

| | | |
|---|---|---|
| JP | 2005-224011 A | 8/2005 |
| JP | 2007135311 | 5/2007 |
| JP | 2008-043057 A | 2/2008 |
| JP | 2008043057 | 2/2008 |
| JP | 2008-225652 A | 9/2008 |
| JP | 2010-252494 A | 11/2010 |

OTHER PUBLICATIONS

A JP Office Action, dated Aug. 21, 2012, issued in JP Application No. 2011-027690.

Office Action issued in German Patent Application No. DE102012100928.7, dated Feb. 5, 2013.

* cited by examiner

MOTOR DRIVING CONTROL APPARATUS FOR CONTROLLING MOTOR OUTPUT ACCORDING TO POWER CHARACTERISTICS OF AC POWER SUPPLY

RELATED APPLICATIONS

The present application is based on, and claims priority from, Japanese Application Number 2011-027690, filed Feb. 10, 2011, the disclosure of which is hereby incorporated by reference herein in its entirety.

BACKGROUND OF THE INVENTION

1. Field of the Invention

The present invention relates to a motor driving control apparatus for controlling the driving of a motor used in a machine tool, a forging press, an industrial machine, etc.

2. Description of the Related Art

In the prior art, for example, in JP3252114B, JP2004-166477A, JP2008-225652A, and JP2008-43057A, a motor driving control apparatus that controls the output of a motor (for example, a servo motor) by determining a command value to be supplied to a motor driving unit to drive the motor, wherein a control parameter for controlling the motor is set based on the voltage of an AC power supply (for example, a three-phase AC power supply) that supplies power to the motor, and the command value is determined based on the control parameter is proposed.

According to such a motor driving control apparatus, since the control parameter can be set by responding to changes in the voltage of the AC power supply, the output of the motor can be controlled appropriately according to the changing voltage of the AC power supply.

The amount of voltage drop that an AC power supply may experience varies depending on the environment where the AC power supply is installed. For example, the amount of voltage drop that occurs when a single AC power supply is supplying power to a plurality of motors is larger than the amount of voltage drop that occurs when a single AC power supply is supplying power to a single motor. When a single AC power supply is supplying power to a plurality of motors, if any of the motors accelerates or the motor speed reaches a maximum speed, the motor output increases and the voltage of the AC power supply further drops, increasing the possibility of adversely affecting the driving of the motors and eventually causing the motors to stall.

However, with the prior art motor driving control apparatus, when the voltage of the AC power supply drops to a level that adversely affects the driving of the motor, since the motor only delivers an output corresponding to the voltage level that adversely affects the driving of the motor, it is not possible to avoid a drop in the voltage of the AC power supply which adversely affects the driving of the motor.

It is an object of the present invention to provide a motor driving control apparatus wherein provisions are made to prevent the driving of a motor from being adversely affected by a voltage drop that may occur with an AC power supply that supplies power to the motor.

SUMMARY OF THE INVENTION

A motor driving control apparatus according to the present invention includes: a motor driving unit which drives a motor; a driving control unit which supplies to the motor driving unit a command value for the motor driving unit to drive the motor; a power characteristic acquiring unit which acquires a power characteristic of an AC power supply that supplies power to the motor; and a control parameter determining unit which determines based on a voltage characteristic of the AC power supply whether, during driving of the motor, the voltage of the AC power supply drops to a level that adversely affects the driving of the motor, and which, when it is determined that the voltage of the AC power supply drops to the level that adversely affects the driving of the motor, sets a control parameter so that the voltage of the AC power supply does not drop below the level that adversely affects the driving of the motor, and supplies the control parameter to the driving control unit in order for the driving control unit to determine the command value.

Preferably, the power characteristic includes the voltage and power of the AC power supply, and when it is determined that the voltage of the AC power supply drops to the level that adversely affects the driving of the motor, the control parameter determining unit calculates, by using the voltage and power of the AC power supply, a limit value for limiting an output of the motor so that the voltage of the AC power supply does not drop below the level that adversely affects the driving of the motor, and determines the control parameter based on the motor output limit value.

According to the present invention, whether, during the driving of the motor, the voltage of the AC power supply drops to the level that adversely affects the driving of the motor is determined based on the voltage characteristic of the AC power supply and, when it is determined that the voltage of the AC power supply drops to the level that adversely affects the driving of the motor, the control parameter is set so that the voltage of the AC power supply does not drop below the level that adversely affects the driving of the motor. When the control parameter is thus set, the voltage of the AC power supply does not drop to the level that adversely affects the driving of the motor, which serves to prevent the driving of the motor from being adversely affected by the voltage drop of the AC power supply connected to the motor.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILED DESCRIPTION

An embodiment of a motor driving control apparatus according to the present invention will be described below with reference to the drawings.

Figure 1:
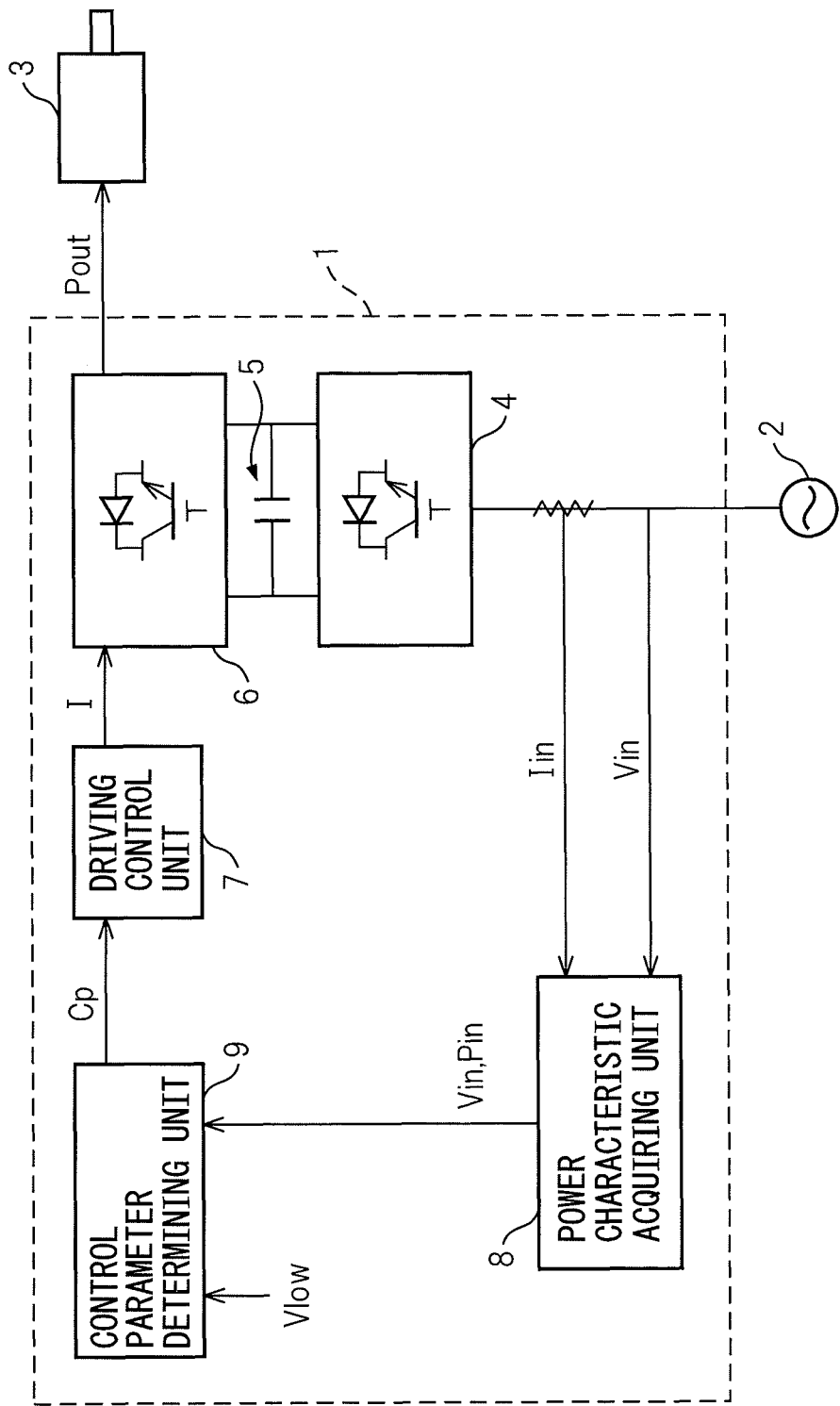
FIG. 1 is a block diagram of an embodiment of a motor driving control apparatus according to the present invention.

Referring to the drawings, FIG. 1 is a block diagram of the embodiment of the motor driving control apparatus according to the present invention. The motor driving control apparatus 1 shown in FIG. 1 is used in a machine tool, a forging press, an industrial machine, etc., and controls the driving of a motor 3 which is supplied with power from an AC power supply 2. For this purpose, the motor driving control apparatus 1 includes a converter 4, a smoothing capacitor 5, an inverter 6, a driving control unit 7, a power characteristic acquiring unit 8, and a control parameter determining unit 9.

A three-phase AC power supply, for example, may be used as the AC power supply 2, but the AC power supply 2 is not limited to a three-phase AC power supply. The motor 3 may be, for example, a servo motor, but is not limited to a servo motor.

The converter 4 includes, for example, a plurality of (for example, six in the case of three-phase AC) rectifying diodes and transistors connected in reverse parallel with the respective rectifying diodes, and converts the AC power supplied from the AC power supply 2 into DC power. The smoothing capacitor 5 is connected in parallel with the converter 4 in order to smooth the voltage rectified by the rectifiers contained in the converter 4. The inverter 6, which is connected in parallel with the smoothing capacitor 5, includes, for example, a plurality of (for example, six in the case of three-phase AC) rectifying diodes and transistors connected in reverse parallel with the respective rectifying diodes, and converts the DC power output from the converter 4 into AC power. In the present embodiment, the converter 4, the smoothing capacitor 5, and the inverter 6 together function as a motor driving unit that drives the motor 3 which is supplied with power from the AC power supply 2.

The driving control unit 7 supplies to the inverter 6 a command value I (for example, a PWM signal) for the motor driving unit, comprising the converter 4, the smoothing capacitor 5, and the inverter 6, to drive the motor 3.

The power characteristic acquiring unit 8 acquires one or more characteristics, from among the voltage Vin, current Iin, power Pin, and impedance Zin of the AC power supply 2, as the power characteristics of the AC power supply 2. In the present embodiment, the power characteristic acquiring unit 8 includes an AC current detector (not shown) for detecting the current Iin, an AC voltage detector (not shown) for detecting the voltage Vin, and a calculator (not shown) for calculating at least one or the other of the power Pin and the impedance Zin from the current Tin and voltage Vin.

The control parameter determining unit 9 is supplied with a target value Vlow from an external apparatus such as a computer (not shown) and with the values of the voltage Vin and power Pin from the power characteristic acquiring unit 8. The target value Vlow is a value by reference to which it is determined whether, during the driving of the motor 3, the voltage Vin has dropped to a level that adversely affects the driving of the motor 3. Then, the control parameter determining unit 9 calculates a control parameter Cp by using the voltage Vin, power Pin, and target value Vlow, as will be described in detail later, and supplies the control parameter Cp to the driving control unit 7. The driving control unit 7 determines the command value I based on the control parameter Cp.

Figure 2:
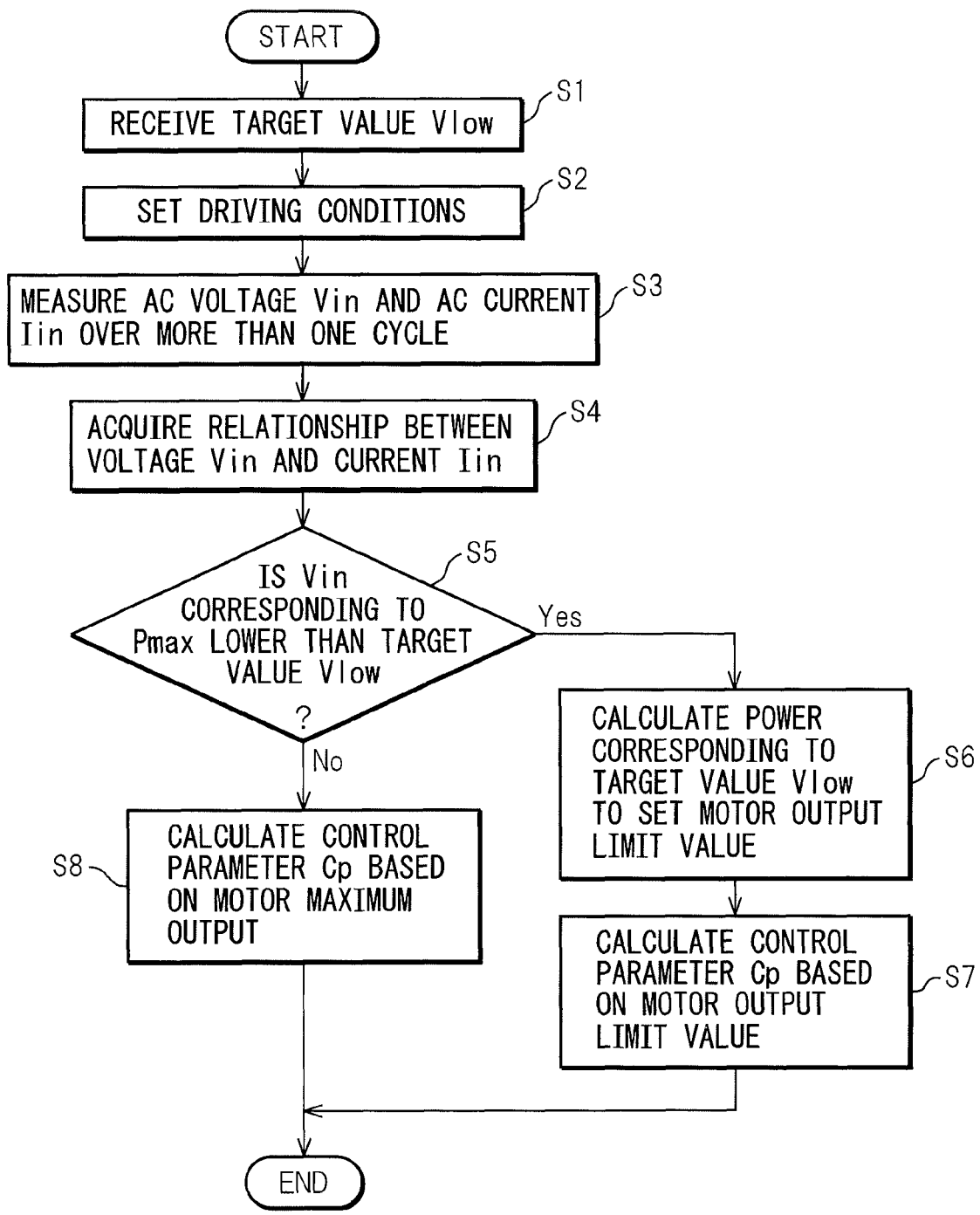
FIG. 2 is a flowchart illustrating the operation of the embodiment of the motor driving control apparatus according to the present invention.

FIG. 2 is a flowchart illustrating the operation of the embodiment of the motor driving control apparatus according to the present invention. The process flow shown in FIG. 2 is carried out by the component elements of the motor driving control apparatus 1 executing a control program stored in a memory not shown.

First, in step S1, the control parameter determining unit 9 receives the target value Vlow from the external apparatus. Next, in step S2, the control parameter determining unit 9 receives driving conditions such as the spindle feed speed of the motor 3, the spindle RPM of the motor 3, etc. from the external apparatus, and sets the driving conditions of the motor 3 accordingly.

In step S3, the motor driving control apparatus 1 test-drives the motor 3 for more than one driving cycle of the motor 3, and the power characteristic acquiring unit 8 measures the voltage Vin and current Iin over the period of more than one driving cycle of the motor 3. Then, the power characteristic acquiring unit 8 calculates the power Pin (=Vin×Iin) and the impedance Zn (=Vin/Iin) from the thus measured voltage Vin and current Iin.

Next, in step S4, the power characteristic acquiring unit 8 supplies the measured values of the voltage Vin and current Iin to the control parameter determining unit 9, and the control parameter determining unit 9 acquires the relationship between the voltage Vin and current Iin from the measured values of the voltage Vin and current Iin.

Qualitatively, it is presumed that the amount of voltage drop of the power supply 2, which is proportional to the output Pout of the motor 3, becomes larger as the impedance Zi increases; therefore, it is presumed that the voltage of the AC power supply 2 when the power Pin is at its maximum output Pmax during the test driving of the motor 3 varies depending on the impedance Zi. Accordingly, by measuring the voltage Vin and current Iin during the test driving of the motor 3, and by acquiring the relationship between the voltage Vin and current Iin from the thus measured voltage Vin and current Iin, the control parameter Cp can be set so that the voltage Vin does not drop below the target value Vlow.

Figure 3:
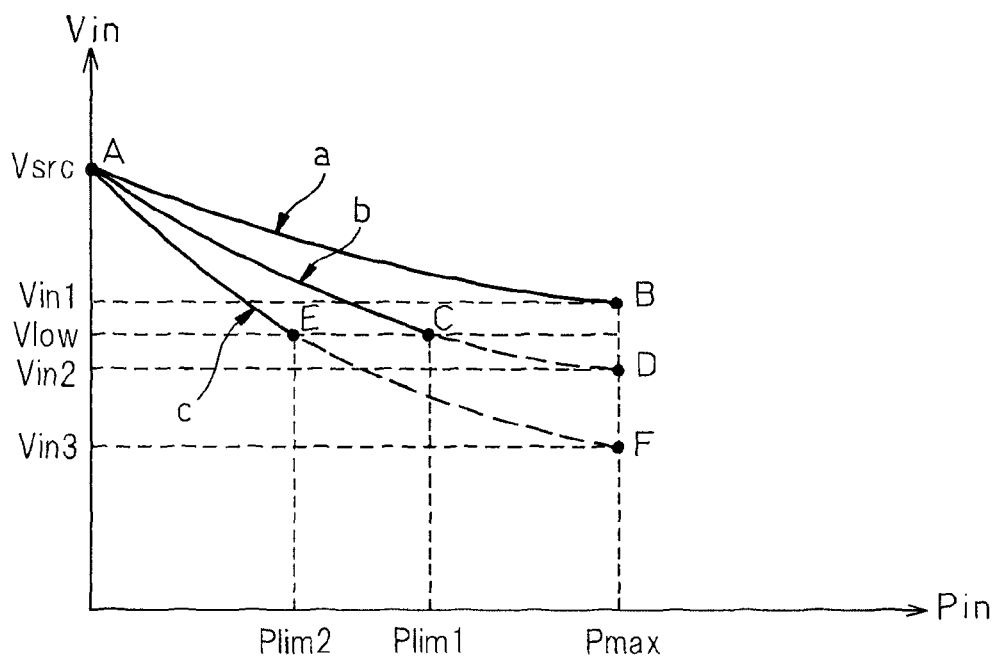
FIG. 3 is a diagram showing the relationship between the voltage and power of an AC power supply.

FIG. 3 is a diagram showing the relationship between the voltage and power of the AC power supply. In FIG. 3, the voltage Vin is plotted along the ordinate and the power Pin along the abscissa, and Vsrc designates the voltage of the AC power supply 2 when the power Pin is zero.

The voltage Vin decreases as the power Pin increases. In the case of a curve "a" represented by a solid line connecting between point A and point B, when the power increases to the maximum output Pmax the voltage Vin decreases to Vin1 which is higher than the target value Vlow. In the case of a curve "b" represented by a solid line connecting between point A and point C and a dashed line connecting between point C and point D, since the impedance Zi is larger than in the case of the curve "a", the voltage Vin becomes equal to the target value Vlow when the power Pin is at Plim1 (<Pmax) and, when the power Pin increases to the maximum output Pmax, the voltage Vin decreases to Vin2 which is lower than the target value Vlow. In the case of a curve "c" represented by a solid line connecting between point A and point E and a dashed line connecting between point E and point F, since the impedance Zi is larger than in the case of the curve "b", the voltage Vin becomes equal to the target value Vlow when the power Pin is at Plim2 (<Plim1) and, when the power Pin increases to the maximum output Pmax, the voltage Vin decreases to Vin3 which is lower than Vin2.

Next, in step S5, the control parameter determining unit 9 determines whether Vin corresponding to the maximum output Pmax is lower than the target value Vlow. If Vin corresponding to the maximum output Pmax is lower than the target value Vlow, i.e., if the relationship such as indicated by the curve "b" or "c" holds between the voltage Vin and the power Pin, then in step S6 the control parameter determining unit 9 calculates the power Pin corresponding to the target value Vlow and sets it as the limit value Plim for limiting the output Pout of the motor 3. For example, when the relationship such as indicated by the curve "b" holds between the voltage Vin and the power Pin, Plim1 is taken as the limit value Plim for the output of the motor 3, and when the relationship such as indicated by the curve "c" holds between the voltage Vin and the power Pin, Plim2 is taken as the limit value Plim for the output of the motor 3.

After step S6, the control parameter determining unit 9 in step S7 calculates the control parameter Cp based on the output limit value Plim (for example, Plim1 or Plim2) of the motor 3, and supplies the control parameter Cp to the driving control unit 7, after which the routine is terminated.

The control parameter Cp here may be set to define the output limit value of the motor 3, the torque limit value of the motor 3, the acceleration/deceleration time constant of the motor 3, or the feed speed override of the motor 3. When controlling the spindle speed of the motor 3, the output limit value of the motor 3 or the torque limit value of the motor 3 is set as the control parameter Cp, and when controlling the spindle position of the motor 3, the acceleration/deceleration time constant of the motor 3 or the feed speed override of the motor 3 is set as the control parameter Cp.

When the output limit value of the motor 3 is set as the control parameter Cp, the spindle output of the motor 3 is controlled to a constant level; for example, when the relationship such as indicated by the curve "b" holds between the voltage Vin and the power Pin, the control parameter Cp is Plim1, and when the relationship such as indicated by the curve "c" holds between the voltage Vin and the power Pin, the control parameter Cp is Plim2. By thus setting Plim (for example, Plim1 or Plim2) to limit the output of the motor 3, the voltage Vin is prevented from dropping below the target value Vlow, i.e., the voltage is prevented from dropping to the level that adversely affects the driving of the motor 3 during the driving of the motor 3.

When the torque limit value of the motor 3 is set as the control parameter Cp, since the relationship "Pout=T×N" holds among the output Pout of the motor 3, the torque T of the motor 3, and the speed N of the motor 3, the maximum torque Tmax of the motor 3 is given as Plim/Nmax, where Plim is the output limit value of the motor 3 and Nmax is the maximum speed of the motor 3. That is, the control parameter Cp is Plim/Nmax.

Figure 4:
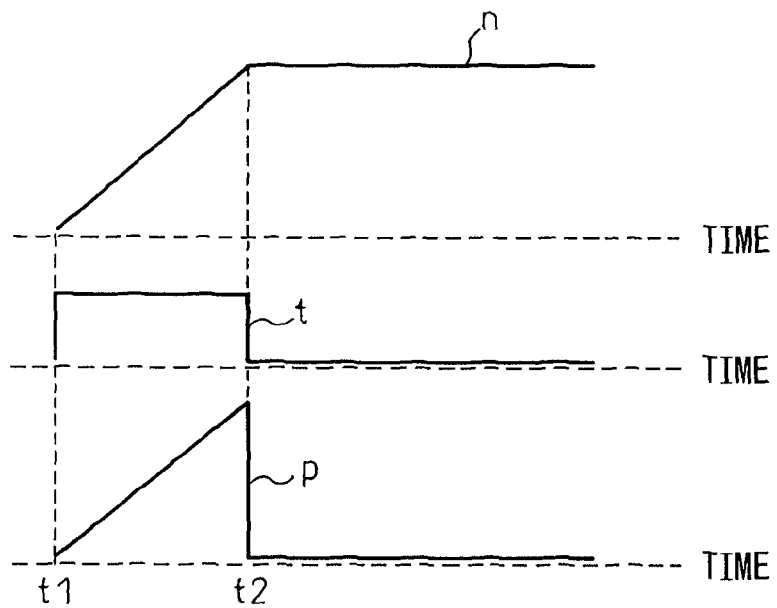
FIG. 4 is a diagram for explaining the relationship among the speed, torque, and output of a motor during fast feed linear acceleration/deceleration.

Next, a description will be given of how the acceleration/deceleration time constant of the motor 3 is set as the control parameter Cp by taking as an example the case where the motor 3 is driven for fast feed linear acceleration/deceleration. FIG. 4 is a diagram for explaining the relationship among the speed, torque, and output of the motor during the fast feed linear acceleration/deceleration. In FIG. 4, solid line "n" indicates how the speed N of the motor 3 changes with time during the fast feed linear acceleration/deceleration, and solid line "t" indicates how the torque T of the motor 3 changes with time during the fast feed linear acceleration/deceleration, while solid line "p" indicates how the output Pout of the motor 3 changes with time during the fast feed linear acceleration/deceleration. As shown in FIG. 4, when the motor 3 is accelerated for a period from time t1 to time t2 at constant acceleration, that is, at constant torque, the output Pout of the motor 3 reaches a maximum at time t2 just before the motor 3 reaches the fast feed speed after completing the acceleration of the motor 3.

When the acceleration of the spindle of the motor 3 at the maximum torque Tmax (=Plim/Nmax) is denoted as Amax, the time t2 the motor 3 takes to reach the maximum speed Nmax is given as Nmax/Amax. By setting an acceleration/deceleration time constant longer than t2 as the control parameter Cp, the output of the motor 3 can be limited so as not to exceed the limit value Plim.

Next, a description will be given of how the feed speed override of the motor 3 is set as the control parameter Cp by taking as an example the case where the motor 3 is used in a cutting machine. When the maximum output Pmax under normal operation (override 100%) is defined by the limit value Plim, the feed speed override OVER is set to (Plim× 100)/Pmax. When the rotating speed of the tool or work is held constant, the amount of cutting per unit time (=the amount of work) decreases as the feed speed override OVER decreases, and likewise, the maximum output Pmax also decreases as the feed speed override OVER decreases.

In the case of a machine in which work is performed by the motion of the feed shaft of the motor 3, such as a forging press, the amount of cutting per unit time (=the amount of work) decreases as the feed speed override OVER decreases, and likewise, the maximum output Pmax also decreases as the feed speed override OVER decreases.

On the other hand, if Vin corresponding to the maximum output Pmax is not lower than the target value Vlow, that is, if the relationship such as indicated by the curve "a" holds between the voltage Vin and the power Pin, then in step S8 the control parameter determining unit 9 calculates the control parameter Cp based on the maximum output Pmax, and supplies the control parameter Cp to the driving control unit 7, after which the routine is terminated.

According to the present embodiment, whether, during the driving of the motor 3, the voltage Vin drops to the level that adversely affects the driving of the motor 3, that is, to the target value Vlow, is determined based on the voltage Vin and power Pin and, when it is determined that the voltage Vin is lower than the target value Vlow, the control parameter Cp is set so that the voltage Vin does not drop below the target value Vlow. When the control parameter Cp is thus set, the voltage Vin does not drop to the level that adversely affects the driving of the motor 3, which serves to prevent the driving of the motor 3 from being adversely affected by the voltage drop of the AC power supply 2 connected to the motor 3.

The present invention is not limited to the above specific embodiment, but numerous changes and modifications can be made thereto. For example, the voltage Vin and current Iin may be measured during the normal operation of the motor 3, and the driving conditions of the motor 3 may be reexamined for every driving cycle of the motor 3.

Further, in the above embodiment, the driving control unit 7, the power characteristic acquiring unit 8, and the control parameter determining unit 9 are shown as being separate component elements, but the driving control unit 7, the power characteristic acquiring unit 8, and the control parameter determining unit 9 may be implemented within the same computer numerically controlled (CNC) equipment.

While the present invention has been described above with reference to the preferred embodiment thereof, those skilled in the art will understand that various changes and modifications can be made without departing from the scope of the appended claims.

The invention claimed is:

1. A motor driving control apparatus comprising:
a motor driving unit which drives a motor;
a driving control unit which supplies to said motor driving unit a command value for said motor driving unit to drive said motor;
a power characteristic acquiring unit which acquires voltage and power of said AC power supply, which are power characteristics of an AC power supply that supplies power to said motor; and
a control parameter determining unit which determines based on the voltage and power of said AC power supply whether, during driving of said motor, the voltage of said AC power supply drops to a level that adversely affects the driving of said motor, and which, when it is determined that the voltage of said AC power supply drops to the level that adversely affects the driving of said motor, calculates, by using the voltage and power of said AC power supply, a motor output limit value so that the voltage of said AC power supply does not drop below the level that adversely affects the driving of said motor, and supplies a control parameter, which is said motor output limit value, a motor torque limit for limiting the output of said motor, a motor acceleration/deceleration time constant for limiting the output of said motor, or a motor feed speed override for limiting the output of said motor, to said driving control unit in order for said driving control unit to determine said command value.

* * * * *